United States Patent
Kim et al.

(10) Patent No.: US 11,315,547 B2
(45) Date of Patent: Apr. 26, 2022

(54) METHOD AND SYSTEM FOR GENERATING SPEECH RECOGNITION TRAINING DATA

(71) Applicant: 42 Maru Inc., Seoul (KR)

(72) Inventors: Dong Hwan Kim, Seoul (KR); Hyun Ok Kim, Gyeonggi-do (KR); You Kyung Kwon, Seoul (KR)

(73) Assignee: 42 MARU INC., Seoul (KR)

(*) Notice: Subject to any disclaimer, the term of this patent is extended or adjusted under 35 U.S.C. 154(b) by 63 days.

(21) Appl. No.: 16/576,497

(22) Filed: Sep. 19, 2019

(65) Prior Publication Data

US 2020/0090640 A1    Mar. 19, 2020

(30) Foreign Application Priority Data

Sep. 19, 2018  (KR) .......................... 10-2018-0112489

(51) Int. Cl.
| | | |
|---|---|---|
| *G10L 15/06* | (2013.01) | |
| *G10L 15/26* | (2006.01) | |
| *G10L 15/01* | (2013.01) | |
| *G10L 15/04* | (2013.01) | |

(52) U.S. Cl.
CPC ............ *G10L 15/063* (2013.01); *G10L 15/01* (2013.01); *G10L 15/04* (2013.01); *G10L 15/26* (2013.01)

(58) Field of Classification Search
CPC ....... G10L 15/063; G10L 15/01; G10L 15/04; G10L 15/26
See application file for complete search history.

(56) References Cited

U.S. PATENT DOCUMENTS

| | | | | |
|---|---|---|---|---|
| 7,120,582 | B1* | 10/2006 | Young ................... | G10L 15/063 |
| | | | | 704/243 |
| 9,245,525 | B2* | 1/2016 | Yeracaris ................ | G10L 15/30 |
| 9,715,875 | B2* | 7/2017 | Piernot ................. | H04W 4/025 |
| 10,847,160 | B2* | 11/2020 | Gruenstein ............. | G10L 15/18 |

(Continued)

FOREIGN PATENT DOCUMENTS

| | | |
|---|---|---|
| JP | H08286695 | 11/1996 |
| JP | 2012108429 | 6/2012 |

(Continued)

OTHER PUBLICATIONS

Extended European Search Report for European Application No. 19198083.8 dated Feb. 21, 2020.

(Continued)

*Primary Examiner* — Michael Colucci
(74) *Attorney, Agent, or Firm* — Burris Law, PLLC

(57) ABSTRACT

Provided is a system for generating speech recognition training data, the system including: a speech data processing module receiving speech data from a user terminal and performing data preprocessing on the received speech data; an auto speech recognition (ASR) interfacing module transmitting the preprocessed speech data to a plurality of ASR engines and acquiring a confidence score and transcription data of the speech data from the plurality of ASR engines; an ASR result evaluating module determining whether the speech data and the transcription data match each other; and a training data managing unit generating training data as a pair of the speech data and the transcription data determined to match each other.

14 Claims, 6 Drawing Sheets

(56) References Cited

U.S. PATENT DOCUMENTS

| | | | | |
|---|---|---|---|---|
| 2011/0055256 A1* | 3/2011 | Phillips | ................... | G10L 15/30 |
| | | | | 707/769 |
| 2016/0104480 A1* | 4/2016 | Sharifi | ................... | G10L 15/08 |
| | | | | 704/254 |
| 2016/0358606 A1 | 12/2016 | Ramprashad et al. | | |
| 2018/0047387 A1* | 2/2018 | Nir | ......................... | G10L 15/02 |

FOREIGN PATENT DOCUMENTS

| | | |
|---|---|---|
| KR | 1020040010860 | 2/2004 |
| KR | 10-1851787 | 4/2018 |

OTHER PUBLICATIONS

Quitry et al., High Quality Agreement-Based Semi-Supervised Training Data for Acoustic Modeling, IEEE, GlobalSIP 2016, pp. 592-596.

* cited by examiner

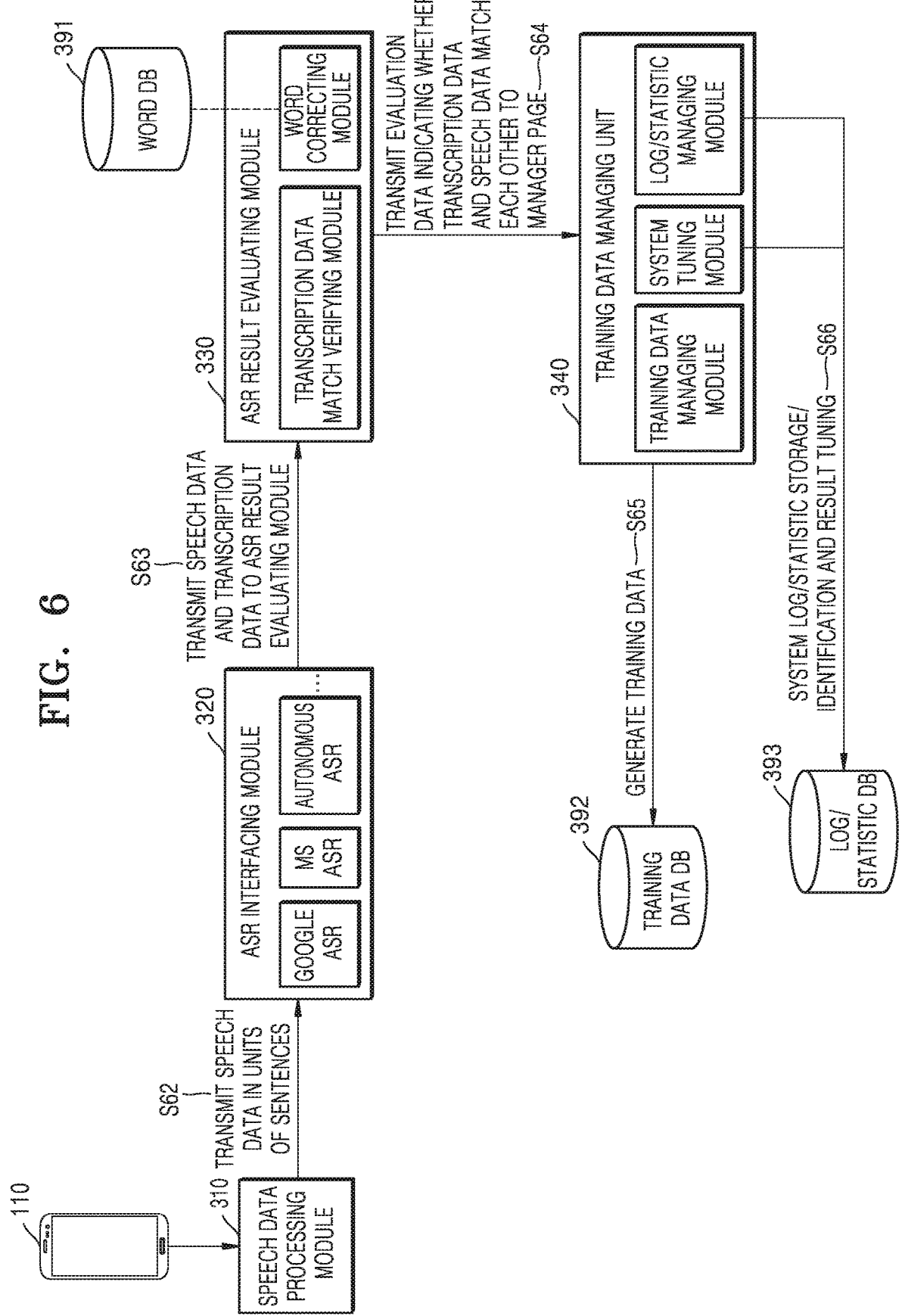

METHOD AND SYSTEM FOR GENERATING SPEECH RECOGNITION TRAINING DATA

CROSS-REFERENCE TO RELATED APPLICATION

This application claims the benefit of Korean Patent Application No. 10-2018-0112489, filed on Sep. 19, 2018, the disclosure of which is incorporated herein in its entirety by reference.

BACKGROUND

1. Field

One or more embodiments relate to artificial intelligence (AI) question-answering (QA) systems, methods, and computer programs, and more particularly, to systems, methods, and computer programs for generating training data for training speech (or voice) recognition by using transcription data generated by a plurality of auto speech recognition (ASR) engines.

2. Description of Related Art

Recently, speech recognition technology has been again spotlighted due to the emergence of various AI-based smart machines such as AI-based speech recognition speakers. There are many reasons why speech recognition technology has been again spotlighted; however, it may be significant that the paradigm of input methods has basically changed.

Before the emergence of speech-based inputs, tools have been manually operated to command computers, smartphones, home appliances, or the like. That is, humans have adapted to the way machines operate, to operate various devices in a manner to perform in a given way. On the other hand, human voice may be the most familiar and easy interface between a user and a device. When a user may operate a device just by speaking in his/her desired way, the user may remotely operate the device conveniently in his/her desired way even without separately trying to learn or practice.

SUMMARY

One or more embodiments include generating training data for training speech recognition.

One or more embodiments include acquiring transcription data matching speech (or voice) data and generating a pair of the acquired speech data and transcription data as training data, without human manual operation by using a pre-existing auto speech recognition (ASR) engine.

Additional aspects will be set forth in part in the description which follows and, in part, will be apparent from the description, or may be learned by practice of the presented embodiments of the disclosure.

According to one or more embodiments, a system for generating speech recognition training data includes: a speech data processing module receiving speech data from a user terminal and performing data preprocessing on the received speech data; an auto speech recognition (ASR) interfacing module transmitting the preprocessed speech data to a plurality of ASR engines and acquiring a confidence score and transcription data of the speech data from the plurality of ASR engines; an ASR result evaluating module determining whether the speech data and the transcription data match each other; and a training data managing unit generating training data as a pair of the speech data and the transcription data determined to match each other.

The training data managing unit may generate the training data based on the speech data, the transcription data, and evaluation data including information about whether the speech data and the transcription data match each other.

The data preprocessing may include segmenting the speech data in units of sentences to generate preprocessed speech data.

The ASR result evaluating module may determine, when a plurality of transcription data result values generated by the ASR interfacing module match with respect to the speech data by more than half, that the speech data and the transcription data matching by more than half match each other.

The ASR result evaluating module may determine whether the speech data and the transcription data match each other, without considering word spacing and punctuation marks of the speech data and the transcription data.

According to one or more embodiments, a method of generating speech recognition training data includes: a speech data processing operation of receiving speech data from a user terminal and performing data preprocessing on the received speech data; an auto speech recognition (ASR) interfacing operation of transmitting the preprocessed speech data to a plurality of ASR engines and acquiring a confidence score and transcription data of the speech data from the plurality of ASR engines; an ASR result evaluating operation of determining whether the speech data and the transcription data match each other; and a training data managing operation of generating training data as a pair of the speech data and the transcription data determined to match each other.

The training data managing operation may include generating the training data based on the speech data, the transcription data, and evaluation data including information about whether the speech data and the transcription data match each other.

The data preprocessing may include segmenting the speech data in units of sentences to generate preprocessed speech data.

The ASR result evaluating operation may include determining, when a plurality of transcription data result values generated by an ASR interfacing module match with respect to the speech data by more than half, that the speech data and the transcription data matching by more than half match each other.

The ASR result evaluating operation may include determining whether the speech data and the transcription data match each other, without considering word spacing and punctuation marks of the speech data and the transcription data.

According to one or more embodiments, a system for generating speech recognition training data includes: an auto speech recognition (ASR) interfacing module receiving speech data from a user terminal, transmitting the received speech data to a plurality of ASR engines, and acquiring a confidence score and transcription data of the speech data from the plurality of ASR engines; an ASR result evaluating module determining whether the speech data and the transcription data match each other, based on at least one of the number of pieces of matching transcription data and the confidence score; and a training data managing unit generating training data as a pair of the speech data and the transcription data determined to match each other.

According to one or more embodiments, a method of generating speech recognition training data includes: an auto speech recognition (ASR) interfacing operation of receiving speech data from a user terminal, transmitting the received speech data to a plurality of ASR engines, and acquiring a confidence score and transcription data of the speech data from the plurality of ASR engines; an ASR result evaluating operation of determining whether the speech data and the transcription data match each other, based on at least one of the number of pieces of matching transcription data and the confidence score; and a training data managing operation of generating training data as a pair of the speech data and the transcription data determined to match each other.

According to one or more embodiments, a computer-readable recording medium stores a computer program for executing the above method according to the present disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram illustrating an overall system structure of a speech recognition training data generating method according to an embodiment of the present disclosure.

DETAILED DESCRIPTION

Figure 1:
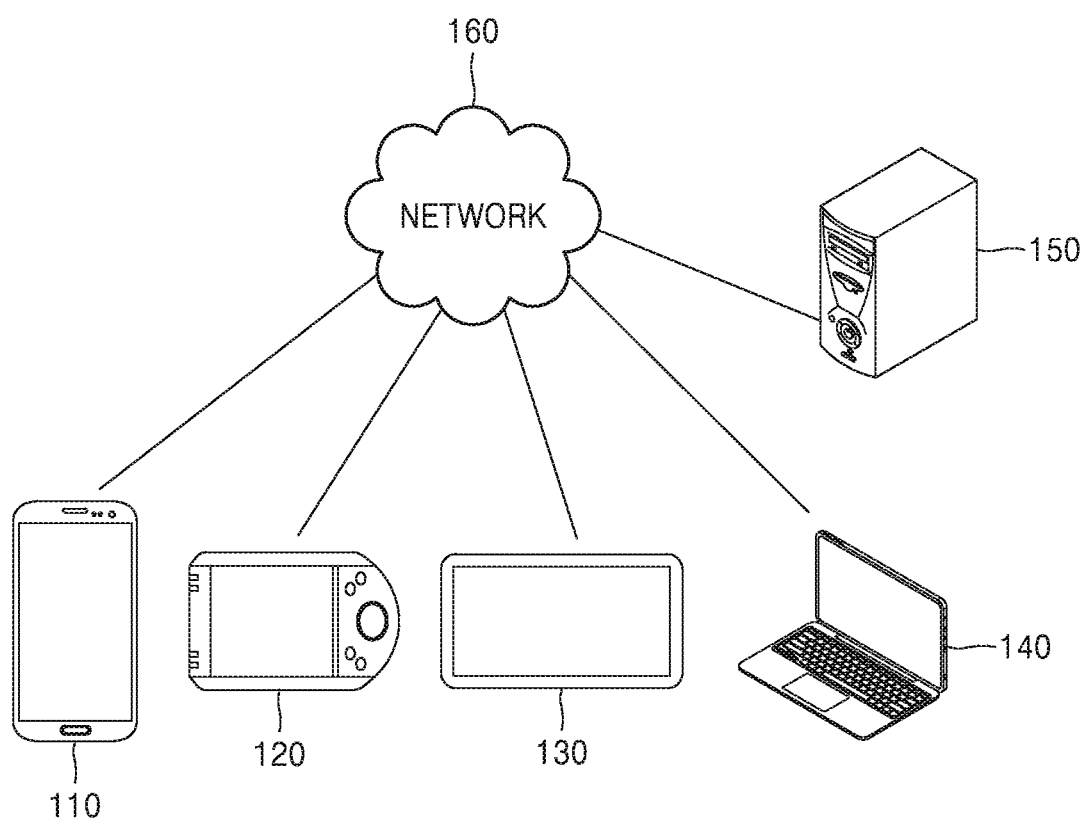
FIG. 1 is a diagram illustrating an example of a network environment according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. FIG. 1 is a diagram illustrating an example of a network environment according to an embodiment of the present disclosure.

The network environment of FIG. 1 illustrates an example including a plurality of user terminals 110, 120, 130, and 140, a server 150, and a network 160. FIG. 1 illustrates an example for describing the present disclosure, and the number of user terminals and the number of servers are not limited to those illustrated in FIG. 1.

The plurality of user terminals 110, 120, 130, and 140 may be mobile terminals or fixed terminals implemented as computer devices. Examples of the plurality of user terminals 110, 120, 130, and 140 may include smart phones, mobile phones, navigation devices, computers, notebook computers, digital broadcasting terminals, personal digital assistants (PDAs), portable multimedia players (PMPs), and tablet personal computers (PCs). For example, a first user terminal 110 may communicate with other user terminals 120, 130, and 140 and/or the server 150 through the network 160 by using a wireless or wired communication method.

The communication method is not limited thereto and may also include not only a communication method using a communication network (e.g., a mobile communication network, a wired internet, a wireless internet, or a broadcasting network) that the network 160 may include, but also a short-range wireless communication between devices. For example, the network 160 may include one or more of networks such as Personal Area Network (PAN), Local Area Network (LAN), Campus Area Network (CAN), Metropolitan Area Network (MAN), Wide Area Network (WAN), Broadband Network (BBN), and the Internet. Also, the network 160 may include one or more of network topologies including bus networks, star networks, ring networks, mesh networks, star-bus networks, tree or hierarchical networks, and the like but is not limited thereto.

The server 150 may be implemented as a computer device or a plurality of computer devices that may communicate with the plurality of user terminals 110, 120, 130, and 140 through the network 160 to provide commands, code, files, content, services, and the like.

For example, the server 150 may provide a file for installing an application to the first user terminal 110 connected through the network 160. In this case, the first user terminal 110 may install an application by using a file provided from the server 150. Also, under the control of an operating system (OS) and at least one program (e.g., a browser or an installed application) included in the first user terminal 110, the first user terminal 110 may connect to the server 150 to receive a service or content provided by the server 150. For example, when the first user terminal 110 transmits a content call (or request) to the server 150 through the network 160 under the control of the application, the server 150 may transmit a unique instant response using a semantic triple-based knowledge extension system to the first user terminal 110 and the first user terminal 110 may display a unique instant response according to the control of the application. As another example, the server 150 may establish a communication session for data transmission/reception and route data transmission/reception between the plurality of user terminals 110, 120, 130, and 140 through the established communication session.

Figure 2:
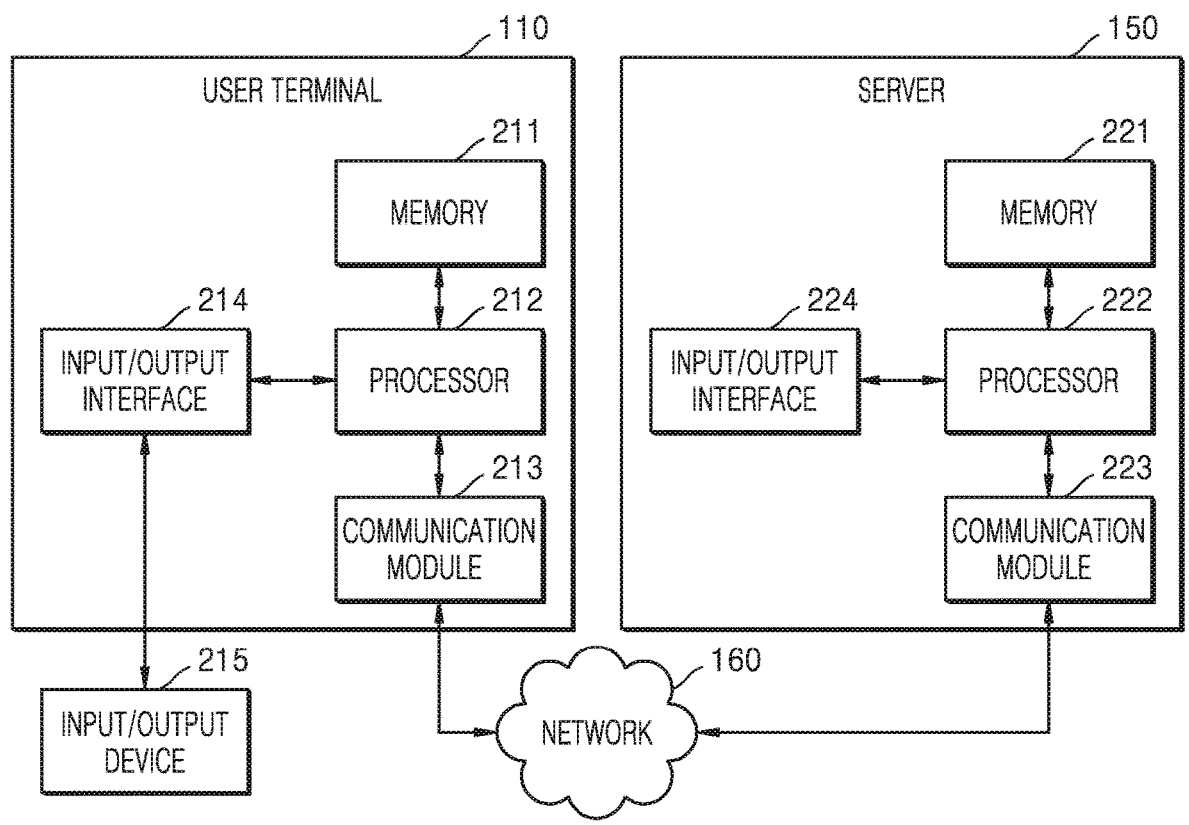
FIG. 2 is a block diagram illustrating an internal configuration of a user terminal and a server, according to an embodiment of the present disclosure.

FIG. 2 is a block diagram illustrating an internal configuration of a user terminal and a server in an embodiment of the present disclosure.

FIG. 2 illustrates an internal configuration of the first user terminal 110 as an example of one user terminal and the server 150 as an example of one server. The other user terminals 120, 130, 140 may also have the same or similar internal configuration.

The first user terminal 110 and the server 150 may include memories 211 and 221, processors 212 and 222, communication modules 213 and 223, and input/output interfaces 214 and 224. The memories 211 and 221 may be computer-readable recording media and may include permanent mass storage devices such as random-access memories (RAMs), read-only memories (ROMs), and disk drives. Also, the memories 211 and 221 may store an operating system and at least one program code (e.g., the code for the above application and the browser installed and driven in the first user terminal 110). Such software components may be loaded from a computer-readable recording medium separate from the memories 211 and 221 by using a drive mechanism. Such a separate computer-readable recording medium may include a computer-readable recording medium such as a floppy drive, a disk, a tape, a DVD/CD-ROM drive, or a memory card. In another embodiment, software components may be loaded into the memories 211 and 221 through the communication modules 213 and 223 instead of a computer-readable recording medium. For example, at least one program may be loaded into the memories 211 and 221 based on the program (e.g., the application described above) installed by the files provided through the network 160 by developers or a file distribution system (e.g., the server 150 described above) distributing installation files of applications.

The processors 212 and 222 may be configured to process commands of computer programs by performing basic arithmetics, logics, and input/output operations. The commands may be provided to the processors 212 and 222 by the memories 211 and 221 or the communication modules 213 and 223. For example, the processors 212 and 222 may be configured to execute the commands received according to the program code stored in a recording device such as the memories 211 and 221.

The communication modules 213 and 223 may provide a function for communication between the first user terminal 110 and the server 150 through the network 160 and a function for communication with another user terminal (e.g., a second user terminal 120) or another server (e.g., the server 150). For example, a request generated by the processor 212 of the first user terminal 110 according to the program code stored in a recording device such as the memory 211 may be transmitted to the server 150 through the network 160 under the control of the communication module 213. Conversely, control signals, commands, content, files, or the like provided under the control of the processor 222 of the server 150 may be received by the first user terminal 110 through the communication module 213 of the first user terminal 110 via the communication module 223 and the network 160. For example, the control signals or commands of the server 150 received through the communication module 213 may be transmitted to the processor 212 or the memory 211, and the content or files thereof may be transmitted to a storage medium that may be further included in the first user terminal 110.

The input/output interfaces 214 and 224 may be units for interfacing with an input/output device 215. For example, an input device may include a device such as a keyboard or a mouse, and an output device may include a device such as a display for displaying a communication session of an application. As another example, the input/output interface 214 may be a unit for interfacing with a device such as a touch screen in which functions for input and output are integrated into one. As a more particular example, when the processor 212 of the first user terminal 110 processes a command of the computer program loaded into the memory 211, a service screen or content constructed by using the data provided by the server 150 or the second user terminal 120 may be displayed on a display through the input/output interface 214.

Also, in other embodiments, the first user terminal 110 and the server 150 may include more components than the components of FIG. 2. However, most components of the related art may not need to be clearly illustrated. For example, the first user terminal 110 may be implemented to include at least a portion of the input/output device 215 or may further include other components such as a transceiver, a Global Positioning System (GPS) module, a camera, various sensors, and a database.

Figure 3:
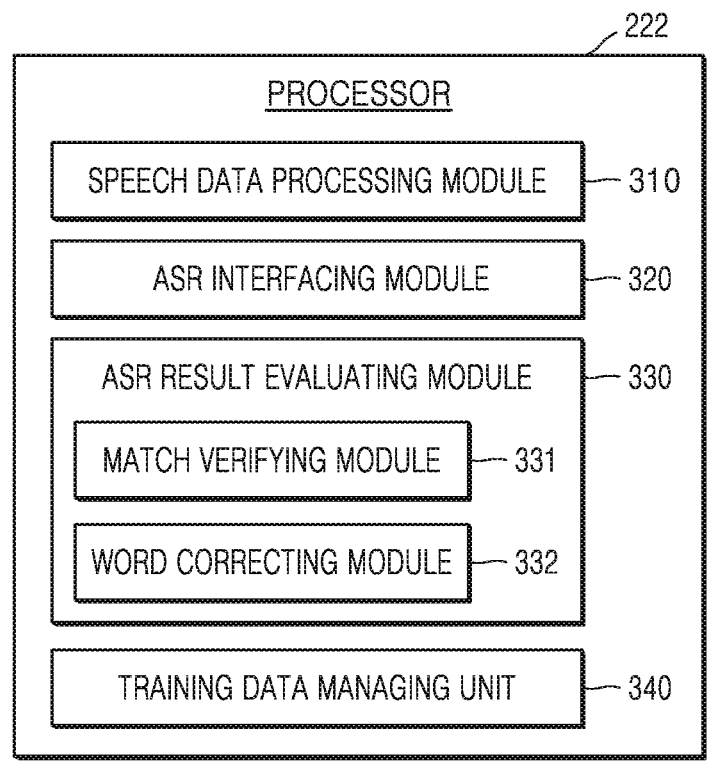
FIG. 3 illustrates an internal configuration of a processor of a server, according to an embodiment of the present disclosure.

FIG. 3 illustrates an internal configuration of a processor according to an embodiment of the present disclosure.

The processor 222 may include a program for constructing speech recognition training data. In the processor 212, a configuration of a speech recognition training data generating system according to an embodiment of the present disclosure may include a speech data processing module 310, an auto speech recognition (ASR) interfacing (or interworking) module 320, an ASR result evaluating module 330, and a training data managing unit 340 as illustrated in FIG. 3. According to embodiments, the components of the processor 222 may be selectively included in or excluded from the processor 222. Also, according to embodiments, the components of the processor 222 may be separated or merged to represent a function of the processor 222.

Here, the components of the processor 222 may be representations of different functions of the processor 222 performed by the processor 222 according to commands provided by the program code stored in the first user terminal 110 (e.g., commands provided by the web browser driven in the first user terminal 110).

Figure 4:
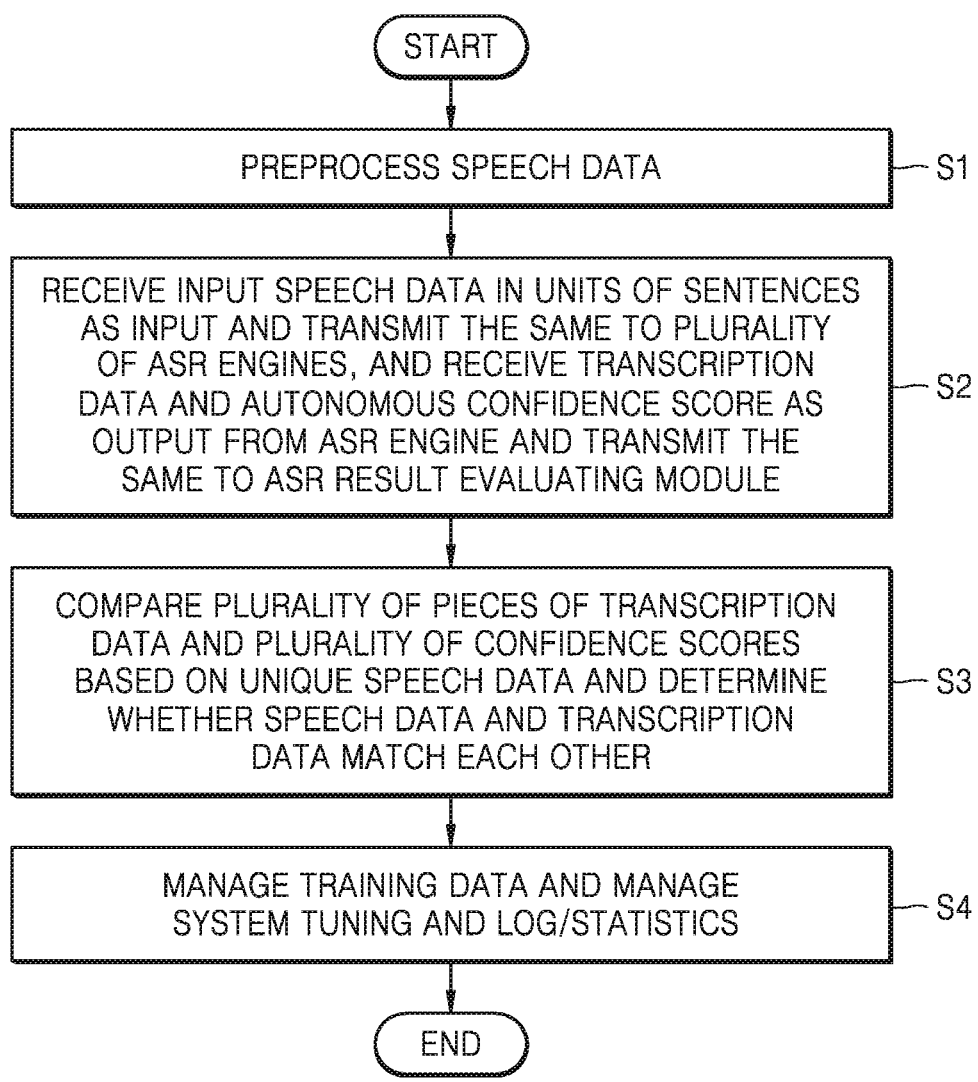
FIG. 4 is a diagram flow chart sequentially illustrating a speech recognition training data generating method according to an embodiment of the present disclosure.

The processor 222 and the components of the processor 212 may control the first user terminal 110 to perform operations S1 to S4 included in a speech recognition training data generating method of FIG. 4. For example, the processor 212 and the components of the processor 212 may be implemented to execute commands (or instructions) according to the code of at least one program and the code of an operating system included in the memory 211.

First, the speech data processing module 310 may perform speech data preprocessing and transmit speech data in the form of a sentence (operation S1).

Next, the ASR interfacing module 320 may receive input speech data in units of sentences as an input and transmit the same to a plurality of ASR engines and may receive transcription data and an autonomous confidence score as an output from an ASR engine and transmit the same to the ASR result evaluating module 330 (operation S2).

Next, the ASR result evaluating module 330 may compare a plurality of pieces of transcription data and a plurality of confidence scores based on unique speech data and determine whether the speech data and the transcription data match each other (operation S3).

Next, the training data managing unit 340 may determine a pair of the matching speech data and transcription data as training data, manage the training data, and manage system tuning and log/statistics (operation S4).

Hereinafter, the present disclosure will be described in more detail with reference to the drawings.

Figure 5:
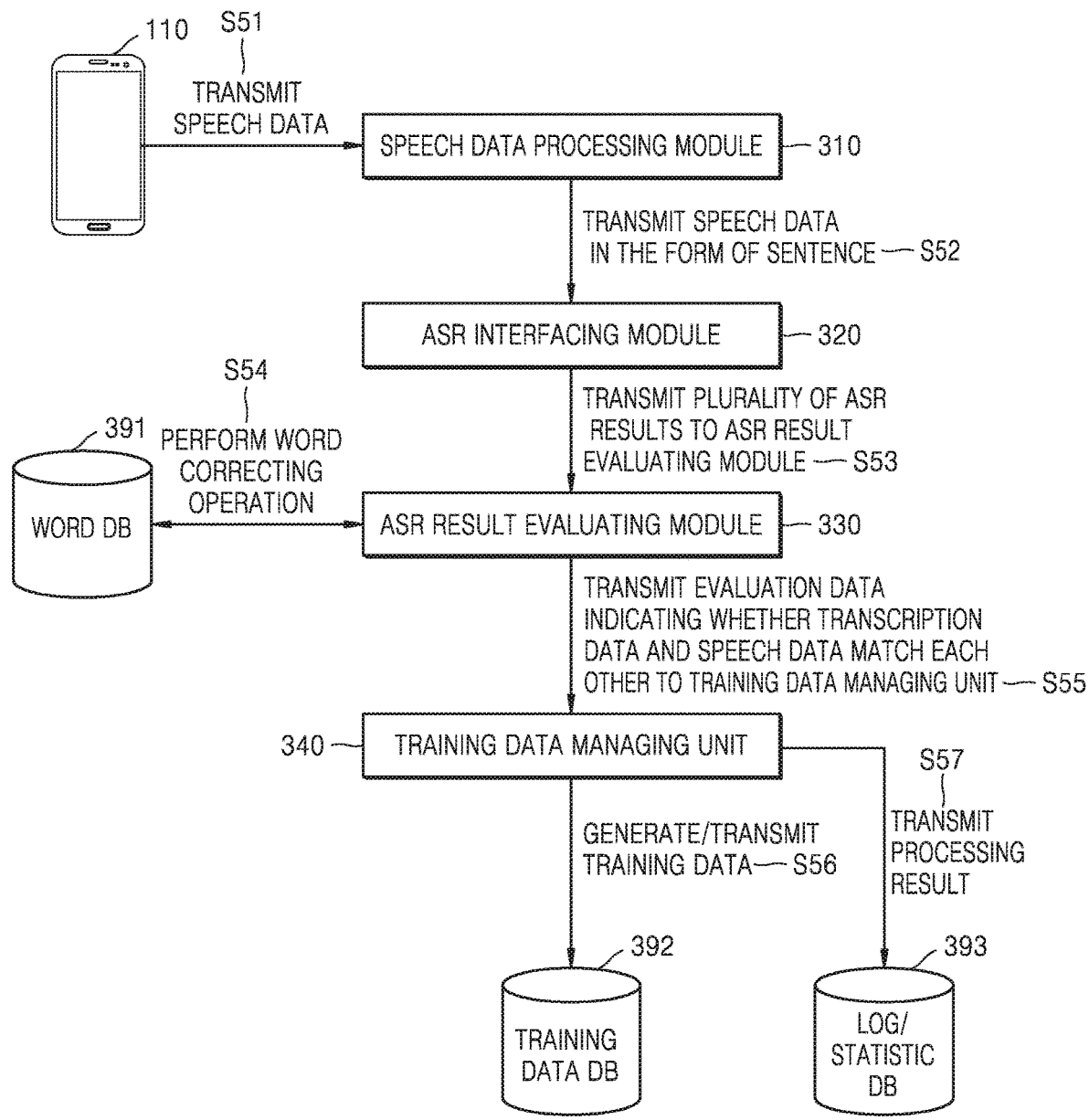
FIG. 5 illustrates a process of a speech recognition training data generating method according to an embodiment of the present disclosure.

FIG. 5 illustrates a process of a speech recognition training data generating method according to an embodiment of the present disclosure.

Referring to FIG. 5, first, a user may transmit speech data to the speech data processing module 310 by using the user terminal 110 (operation S51). The speech data generated by the user may be collected data or manually generated data and may include various types of speech data. That is, the speech data received as an input may be manually constructed data or may be data obtained by extracting only speech (or voice) from another broadcast/video.

Also, the speech data processing module 310 may receive the speech data generated by the user and perform data preprocessing to segment the same in units of sentences. More particularly, the speech data processing module 310 may cut the received speech data in units of sentences and transmit the same to the ASR interfacing module 320. In this case, data such as a paragraph may be cut into sentences based on speech (or voice) intervals, sentence termination endings, or the like.

For example, when there is an expression "I went for a walk with my mother today. It was sunny and windy, so it was a nice day for a walk.", the expression may be divided into 'I went for a walk with my mother today.'/(and) 'It was sunny and windy, so it was a nice day for a walk.'

Also, the speech data processing module 310 may transmit the speech data in the form of segmented sentences to the ASR interfacing module 320 (operation S52). Meanwhile, in another embodiment of the present disclosure, the speech data may be directly transmitted to the ASR interfacing module 320 without preprocessing by the speech data processing module 310.

Upon receiving the speech data in the form of sentences, the ASR interfacing module 320 may transmit a plurality of ASR results to the ASR result evaluating module 330 (operation S53). More particularly, the ASR interfacing module 320 may transmit transcription data about speech data acquired from a plurality of ASR engines to the ASR result evaluating module 330 together with a confidence score. In this case, the confidence score may be autonomously returned by the ASR engine together with the transcription data.

In this case, the ASR interfacing module 320 may interface (or interwork) with the plurality of ASR engines. For example, speech data may be input into various types of ASR engines such as an ASR model provided by Google, an ASR model provided by Microsoft (MS), and an ASR model provided by Naver through interfacing with an external API or the like, and the transcription data result value corresponding thereto and the confidence score of the model may be transmitted to the ASR result evaluating module 330.

Next, upon receiving the plurality of ASR results, the ASR result evaluating module 330 may determine whether the transcription data and the speech data received from the ASR interfacing module 320 match each other and transmit the result thereof to the training data managing unit 340, that is, a manager page (operation S55). A detailed evaluation example and method of performing evaluation by the ASR result evaluating module 330 is as follows.

First, the ASR result evaluating module 330 may compare a plurality of transcription data result values generated by the ASR interfacing module 320 with respect to the speech data and, when they match in plurality, determine that the speech data and the transcription data match each other (operation S330-1). In this case, the ASR result evaluating module 330 may verify whether the result values match exactly without considering word spacing and punctuation marks for accurate comparison.

Next, when there is no match result in the comparison between the plurality of transcription data result values generated by the ASR interfacing module 320, based on one result in which the highest confidence score is returned by the ASR interfacing module 320, when the confidence score is higher than a preset confidence score, it may be determined that the speech data and the transcription data match each other. For example, when the confidence score of the transcription data derived from Google ASR is 95.6% and a preset confidence score of Google ASR is 95%, it may be determined that the corresponding data match each other (operation S330-2).

According to an embodiment of the present disclosure, the preset confidence score of the external ASR may be automatically set. Alternatively, according to another embodiment of the present disclosure, the preset confidence score of the external ASR may be manually set by a manager. More particularly, the confidence score corresponding to the external ASR may be automatically set as below.

First, in operation S330-1 described above, a plurality of transcription data result values generated by a plurality of external ASRs may be compared to record the confidence score result of each external ASR module in a system log based on the confidence score determined as a match. Also, when the corresponding log has accumulated to a certain value or more, the confidence score of each external ASR may be updated based on the corresponding log. For example, when a match determination is made in the case of 90% or more on average in the Google ASR and a match determination is made in the case of 95% or more on average in the MS ASR in the result of operation S330-1, it may be automatically set to make a match determination when the Google ASR is 90% or more and the MS ASR is 95% or more in the confidence score determination of operation S330-2.

When no match determination is made even in operation S330-2, the ASR result evaluating module 330 may perform a word correction operation to post-correct the ASR transcription data (operation S54) and then finally verify whether there is a match result among the results. The word representation methods of the external ASRs may be different from each other, and the same speech may be represented as a "template" in an external ASR engine, whereas it may be represented as a "tamplate" in another external ASR engine. According to an embodiment of the present disclosure, a word correction operation may be performed with reference to a word database (DB) 391 in consideration of a case where the word representation method is different for each external ASR, the ASR-based transcription data may be standardized, each of the corresponding results may be compared, and a match determination may be made when there is even one match result.

In this case, the word DB 391 based on rules and statistics may be used to perform a word correction operation, and the word DB 391 and the conversion rule thereof may be autonomously managed and updated.

The ASR result evaluating module 330 may transmit the speech data, the transcription data, and evaluation data indicating whether the speech data and the transcription data match each other, to the training data managing unit 340 (operation S55).

The training data managing unit 340 may finally generate training data based on the speech data, the transcription data, and the evaluation data indicating whether the speech data and the transcription data match each other, which are received from the ASR result evaluating module 330. The speech data and the transcription data determined to match each other may be automatically paired and generated as training data. In this way, according to an embodiment of the present disclosure, the speech recognition training data generating system may construct the training data.

Meanwhile, the training data managing unit 340 may also generate training data with respect to the speech data and the transcription data determined to mismatch each other. For this, the speech data and the transcription data determined to mismatch each other may be transmitted to the ASR interfacing module 320 to go through operations S2 and S3 (as shown in FIG. 4) again. Alternatively, when the manager directly hears the speech data and modifies the transcription data, the training data may be generated based on the modified transcription data input by the manager.

FIG. 6 is a diagram illustrating an overall system structure of a speech recognition training data generating method according to an embodiment of the present disclosure.

First, referring to FIG. 6, the speech data processing module 310 may collect speech data from the user terminal 110, perform preprocessing on the collected speech data in units of sentences, and then transmit the speech data to the ASR interfacing module 320 in units of sentences (operation S62). In this case, the speech data received as an input from the user terminal 110 may be manually constructed data or may be data obtained by extracting only speech (or voice) from another broadcast/video.

Next, the ASR interfacing module 320 may receive speech data as an input and input the same to a plurality of ASR engines and may receive transcription data and an autonomous confidence score as an output from an ASR engine and transmit the same to the ASR result evaluating module 330.

According to an embodiment of the present disclosure, the ASR interfacing module 320 may be a module capable of interfacing (or interworking) with a plurality of internal and external ASR engines. For example, the ASR interfacing module 320 may interface with a Google ASR, an MS ASR, or an autonomous ASR. More particularly, the ASR interfacing module 320 may interface with an ASR engine (e.g., Google ASR or MS ASR) that is autonomously distributed from outside by using a deep learning model, and an ASR (autonomous ASR) that is constructed by using an autonomous algorithm or uses an open source.

Also, the ASR interfacing module 320 may construct a different ASR interfacing system for each supported language of the ASR engine and transmit the speech data thereto. According to an embodiment of the present disclosure, when a particular ASR engine generates transcription data based on Korean, only an ASR model supporting Korean may be used; and when a particular ASR engine generates transcription data based on English, speech data may be transmitted only with respect to an ASR model supporting English. That is, the ASR interfacing module 320 may transmit the speech data as an input to an ASR module supporting each language and transmit the speech data, the derived transcription data, and the confidence score as an output to the ASR result evaluating module 330 (operation S63).

Next, the ASR result evaluating module 330 may determine whether the speech data and the transcription data match each other. More particularly, the ASR result evaluating module 330 may receive the speech data, the transcription data, the confidence score, and each ASR engine use data provided by the ASR interfacing module 320, compare a plurality of pieces of transcription data and a plurality of confidence scores based on unique speech data, and determine whether the speech data and the transcription data match each other.

The ASR result evaluating module 330 may include a transcription data match verifying module and a word correcting module, and the transcription data match verifying module may determine whether the speech data and the transcription data match each other, through first to third match verifying processes below.

In the first match verifying process, the transcription data match verifying module of the ASR result evaluating module 330 may compare the transcription data of a plurality of ASR engines with respect to a piece of unique speech data and determine that the transcript data match the speech data when the transcript data acquired from the plurality of ASR engines matches by more than half. In this case, the transcription data match verifying module may match and compare word spacing and punctuation marks through ASR preprocessing. Also, a match/mismatch determination may be made according to the number of pieces of matching transcription data.

As a more particular example, in an example of Table 1 below, when more than half of the transcription data matches with respect to the speech data, it may be determined that the speech data and the transcription data match each other. For example, when the speech data says 'The sky is clear today.' and the transcription data is derived from the external ASR as below, because two results among a total of three pieces of transcription data match, it may be determined that the speech data and the transcription data match each other.

TABLE 1

| ASR engine used | Transcription data | Match/mismatch |
|---|---|---|
| Google | The sky is clear today | Match |
| MS | The sky is clea~ today. | Mismatch |
| Naver | The sky is clear today. | Match |

When a mismatch determination is made in the first match verifying process, the transcription data match verifying module may compare the confidence scores of the results of the ASR interfacing module 320 and one result of the highest confidence score among the transcription data in the second match verifying process. In this case, when the confidence score of the transcription data derived from the ASR engine is higher than the confidence score of the result of the ASR interfacing module 320, it may be determined that the speech data and the transcription data match each other. However, when the former is equal to or lower than the latter, a mismatch determination may be made.

In this case, an initial value of the confidence score of the ASR engine may be a preset value set by the manager, and when sufficient samples are accumulated, the confidence score may be automatically adjusted for each ASR engine. The confidence score adjustment may be made according to the value arbitrarily set by the manager through a test before system application, and when sufficient samples are accumulated, the confidence score may be systematically and automatically adjusted for each ASR module. This may be determined by the match/mismatch selected in the first match verifying process described above.

Particularly, in the first match verifying process, the average confidence score may be adjusted for each ASR engine when sufficient samples are collected through the confidence score of the transcription data selected according to the majority principle. For example, when the Google ASR model is selected in the first match verifying process in the case of an average confidence score of 95% or more and the MS ASR model is selected in the first match verifying process in the case of an average confidence score of 98% or more, even when the manager initially manually sets to trust in a value of 90% or more, only when the transcription data derived through the Google ASR model has a value of 95% or more and the transcription data derived through the MS ASR model has a value of 98% or more, it may be determined that the speech data and the transcription data match each other. That is, when a particular ASR engine passes by a certain reference or more in the first match verifying process, the average confidence score of the particular ASR engine instead of the confidence score arbitrarily set by the manager may be automatically modified into the confidence score of subsequent transcription data. Also, according to an embodiment of the present disclosure, the confidence score of the transcription data may be basically managed by the system after the confidence score is automatically modified as described above; however, because the manager does not use the corresponding option, the confidence score of the transcription data may be used only as the user setting value. In this case, in the case of a certain quantity reference, a reference may be, for example, 100 or more and the manager may modify a certain quantity.

Next, when a match determination is not made despite the second match verifying process, the ASR result evaluating module 330 may correct the word by using the word correcting module and may compare whether there is a value equal in transcription data and determine, when there is the value, that the corresponding value and the speech data match each other.

For example, when a sentence 'I modified the PowerPoint template today.' is provided as the speech data and a mismatch determination is made despite the first and second match verifying processes, the word correcting module may be used to perform a word correction on the generated transcription data.

In this case, when there are a sentence 'I modified the PowerPoint tamplate today.' and a sentence 'I modified the PowerPoint templet today', the words 'tamplate' and 'templet' may be modified into 'template' through the word correcting module. In this way, in both cases, a conversion may be made as 'I modified the PowerPoint template today.' and thus it may be verified that the speech data and the transcription data match each other.

The word correcting module of the ASR result evaluating module 330 may be a module for standardizing portions having different expressions while having the same meaning based on the pre-constructed word DB 391. The word correcting module may operate on a rule basis by using a morpheme analysis and a word DB. The word DB 391 may be continuously managed by the manager.

According to an embodiment of the present disclosure, the speech data and the transcription data may be compared through the first to third match verifying processes described above, and when a match determination is made in any one of the first to third match verifying processes, it may be determined that the speech data and the transcription data match each other and the corresponding result may be transmitted to the training data managing unit 340. When a match determination is not made in the above operation, a mismatch determination may be made and the corresponding result may also be transmitted to the training data managing unit 340. The ASR result evaluating module 330 may transmit the speech data, the transcription data, and evaluation data indicating whether the speech data and the transcription data match each other, to the training data managing unit 340 (operation S64).

Next, the training data managing unit 340 may include a training data managing module, a system tuning module, and a log/statistic managing module. The training data managing module may generate or store training data based on the result received from the ASR result evaluating module 330. Also, the system tuning module may provide a platform for manually managing the system, such as identifying the result of the log/statistic managing module and manually fixing the confidence score values of the entire system when necessary. The log/statistic managing module may store the result of the entire system and identify various statistics and results.

The training data managing module of the training data managing unit 340 may pair the speech data and the transcription data determined to match each other, based on the result passed from the ASR result evaluating module 330, construct training data, and store the training data in a training data DB 392. In this case, data determined as a mismatch may be re-generated as training data through the following two methods.

The first method may be a method of re-transmitting the mismatch data to the ASR interfacing module 320. Because there is a possibility of a mismatch due to an error in an individual ASR engine such as an external ASR engine, in the case of a mismatch, it may be re-transmitted to the ASR interfacing module 320 and transcription data may be automatically re-generated and determined through the above determination result and thus training data may be automatically generated. In the second method, the manager may directly hear the speech data, modify the pre-used transcription data, and store the same as training data. Through the above two methods, the transcription data determined as a mismatch may also be generated as training data paired with the speech data through suitable processing.

In addition, the training data managing unit 340 may manage the entire system and identify the current state through other system tuning and log/statistic managing modules. The system tuning module may set the algorithm confidence score and the number of the ASR interfacing module 320 and identify the overall current system state through a log/statistic system.

The embodiments of the present disclosure described above may be implemented in the form of computer programs that may be executed through various components on a computer, and the computer programs may be recorded in computer-readable recording mediums. In this case, the medium may be any one that may continuously store computer-executable programs or temporarily store them for execution or download. Also, the medium may be any recording unit or storage unit in the form of a single hardware unit or a combination of hardware units, but is not limited to a medium directly connected to a computer system and may be distributed on a network. Examples of the mediums may include magnetic recording mediums such as hard disks, floppy disks, and magnetic tapes, optical recording mediums such as CD-ROMs and DVDs, magneto-optical recording mediums such as floptical disks, and storage mediums such as ROMs, RAMs, and flash memories that are configured to store program instructions. Also, as another example of the mediums, recording mediums or storage mediums may be managed by app stores distributing applications or by sites or servers supplying or distributing various other software.

Although the present disclosure has been described above with reference to the drawings, certain embodiments, and particular features such as particular component, this is merely provided to promote a more comprehensive understanding of the present disclosure, the present disclosure is not limited to the above embodiments, and those of ordinary skill in the art may made various modifications therein.

According to the present disclosure, it may be possible to generate training data for training speech recognition.

The present disclosure may acquire transcription data matching speech data by using a preexisting ASR engine and generate a pair of the acquired speech data and transcription data as training data, thereby reducing the time and cost of generating training data.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

We claim:

1. A system for generating speech recognition training data, the system comprising:
a speech data processing module receiving speech data from a user terminal and performing data preprocessing on the received speech data;
an auto speech recognition (ASR) interfacing module transmitting the preprocessed speech data to a plurality of ASR engines and acquiring a confidence score and transcription data of the speech data from the plurality of ASR engines; wherein the preprocessed speech data includes first speech data and second speech data;
an ASR result evaluating module determining whether the preprocessed speech data and the transcription data match each other; and
a training data managing unit generating first training data as a pair of the first speech data and the transcription data determined to match each other based on a result passed from the ASR result evaluating module;
wherein the training data managing unit is further configured to:
construct the first training data and store the first training data in a training database;
automatically regenerate, without an input from the user terminal, second training data as a pair of the second speech data and transcription data determined as a mismatch; and
transmit the second training data back to the ASR interfacing module;
wherein the ASR interfacing module is further configured to repeat operations of transmitting the second speech data to the plurality of ASR engines, and acquiring the confidence score from the plurality of ASR engines, and without an input from the user terminal, automatically regenerating new transcription data or modifying the transcription data determined as the mismatch to the second speech data.

2. The system of claim 1, wherein
the training data managing unit generates the training data based on the speech data, the transcription data, and evaluation data including information about whether the speech data and the transcription data match each other.

3. The system of claim 1, wherein
the data preprocessing comprises segmenting the speech data in units of sentences to generate preprocessed speech data.

4. The system of claim 1, wherein
the ASR result evaluating module determines, when a plurality of transcription data result values generated by the ASR interfacing module match with respect to the speech data by more than half, that the speech data and the transcription data matching by more than half match each other.

5. The system of claim 1, wherein
the ASR result evaluating module determines whether the speech data and the transcription data match each other, without considering word spacing and punctuation marks of the speech data and the transcription data.

6. A method of generating speech recognition training data, the method comprising:
a speech data processing operation of receiving speech data from a user terminal and performing data preprocessing on the received speech data;
an auto speech recognition (ASR) interfacing operation of transmitting the preprocessed speech data to a plurality of ASR engines and acquiring a confidence score and transcription data of the speech data from the plurality of ASR engines;
wherein the preprocessed speech data includes first speech data and second speech data;
an ASR result evaluating operation of determining whether the preprocessed speech data and the transcription data match each other; and
a training data managing operation of generating first training data as a pair of the first speech data and the transcription data determined to match each other, based on a result passed from the ASR result evaluating operation;
wherein the training data managing operation is further configured to:
construct the first training data and store the first training data in a training database;
automatically regenerate, without an input from the user terminal, second training data as a pair of the second speech data and transcription data determined as a mismatch; and
transmit the second training data back to the ASR interfacing module;
wherein the ASR interfacing module is further configured to repeat operations of transmitting the second speech data to the plurality of ASR engines, acquiring the confidence score from the plurality of ASR engines, and without an input from the user terminal, automatically regenerating new transcription data or modifying the transcription data determined as the mismatch to the second speech data.

7. The method of claim 6, wherein
the training data managing operation comprises generating the training data based on the speech data, the transcription data, and evaluation data including information about whether the speech data and the transcription data match each other.

8. The method of claim 6, wherein
the data preprocessing comprises segmenting the speech data in units of sentences to generate preprocessed speech data.

9. The method of claim 6, wherein
the ASR result evaluating operation comprises determining, when a plurality of transcription data result values generated by an ASR interfacing module match with respect to the speech data by more than half, that the speech data and the transcription data matching by more than half match each other.

10. The method of claim 6, wherein
the ASR result evaluating operation comprises determining whether the speech data and the transcription data match each other, without considering word spacing and punctuation marks of the speech data and the transcription data.

11. A system for generating speech recognition training data, the system comprising:
an auto speech recognition (ASR) interfacing module receiving speech data from a user terminal, transmitting the received speech data to a plurality of ASR engines, and acquiring a confidence score and transcription data of the speech data from the plurality of ASR engines; wherein the preprocessed speech data includes first speech data and second speech data;

an ASR result evaluating module determining whether the speech data and the transcription data match each other, based on at least one of the number of pieces of matching transcription data and the confidence score; and a training data managing unit generating first training data as a pair of the first speech data and the transcription data determined to match each other based on a result passed from the ASR result evaluating module;

wherein the training data managing unit is further configured to:
   construct the first training data and store the first training data in a training database;
   automatically regenerate, without an input from the user terminal, second training data as a pair of the second speech data and transcription data determined as a mismatch; and
   transmit the second training data back to the ASR interfacing module;

wherein the ASR interfacing module is further configured to repeat operations of transmitting the second speech data to the plurality of ASR engines, acquiring the confidence score from the plurality of ASR engines, and without an input from the user terminal, automatically regenerating new transcription data or modifying transcription data determined as the mismatch to the second speech data.

12. The system of claim 11, wherein
the training data managing unit generates the training data based on the speech data, the transcription data, and evaluation data including information about whether the speech data and the transcription data match each other.

13. The system of claim 11, wherein
the ASR result evaluating module determines, when a plurality of transcription data result values generated by the ASR interfacing module match with respect to the speech data by more than half, that the speech data and the transcription data matching by more than half match each other.

14. The system of claim 11, wherein
the ASR result evaluating module determines whether the speech data and the transcription data match each other, without considering word spacing and punctuation marks of the speech data and the transcription data.

* * * * *